Patented May 23, 1950

2,508,474

UNITED STATES PATENT OFFICE 2,508,474

PRODUCTION OF ACTIVATED CARBON

John A. Slyh, Fostoria, Milton Janes, Lakewood, and Ernest G. Doying, Berea, Ohio, assignors, by mesne assignments, to Union Carbide and Carbon Corporation, a corporation of New York No Drawing. Application September 19, 1945, Serial No. 617,456

6 Claims. (Cl. 252—422)

The invention relates to the making of activated carbon, and particularly to an improved chemical impregnation process for producing active carbon from wood shavings, sawdust, or other cellulosic material of low density, said carbon characteristics excellently fitting it for use as gas mask absorbent.

Activated carbon has been made by treatment with chemical agents of various hydrocarbonaceous materials, including brown coal, bituminous coal, peat, lignite and sawdust. The process has consisted basically in the steps of impregnating the cellulosic or carbonaceous material in finely-divided form with a dehydrating or carbonizing agent such as zinc chloride, phosphoric acid, potassium sulphide, or the like; forming the treated mass into aggregates of desired size; heating or calcining at an appropriate temperature; and subsequently leaching out the residue of the dehydrating agent and its soluble decomposition products. By prior practice, however, chemical activation of light porous materials, like sawdust, has not been successful in producing activated carbon suitable to the severe requirements of modern gas mask service, and the products so made invariably have been mechanically weak, of low density, and lacking in other properties like adsorptive capacity, catalytic activity, and retentivity, which are very essential to the satisfactory function of a toxic gas adsorbent. Hence the prior art has in general adopted more dense forms of raw material, such as cocoanut and other nut shell charcoals, for the making of gas mask quality active carbon, and has preferred an activation by means of gas oxidation.

It is an object of this invention to produce activated carbon from wood shavings or sawdust which has excellent characteristics, and is substantially improved in those properties essential to its use in the capacity of a toxic gas and vapor adsorbent. A further object is to provide improvements in the chemical activation of porous cellulosic materials like wood, to produce an active carbon, which, after conventional catalyst impregnation, has qualities comparable with, or superior to, the best gas mask adsorbents heretofore known.

The proposed process follows basically the above general description of chemical activation, in that it includes the steps of impregnation, forming of the mass into aggregates, and calcining. It differs, however, over prior recognized procedure, in the finding that modifications are essential, coupled with a most careful and accurate control of processing conditions, in order to make a product of real value for gas mask use from a material like sawdust. The combined effect and action of the process embodiments to be described have accomplished results both novel and important to the activated carbon art.

In accordance with the invention, finely-divided wood sawdust or shavings, preferably of a particle size less than 8 mesh (U. S. standard sieve scale), is first thoroughly and uniformly impregnated with an aqueous solution of zinc chloride. Practically any species of wood is suitable, although the hard woods have provided results somewhat more consistent than the low density soft woods. A preferred zinc chloride solution for the impregnation is one of about 65% by weight, as solutions less concentrated than this are not properly absorbed by the wood particles, and more highly concentrated solutions promote a very rapid, difficultly controllable, reaction on subsequent heating. The zinc chloride solution is added to the wood preferably in quantities sufficient to provide about 110 parts by weight of zinc chloride based on the dry salt to about 100 parts of the dry wood particles.

After the initial impregnation, the mix is heated, with agitation, under conditions controlled to provide the desired degree of dehydration and carbonization of the wood. Suitable apparatus for this purpose is a steel trough, steam jacketed, bread type mixer, but other reaction vessels can be used, which have provision for uniform agitation of the charge and controlled rate and volume of heat input. The heating schedule is of essential importance at this stage of the process, and this is adjusted so that the charge reaches a temperature of from 120° C. to 145° C., and preferably between about 128° C. and 132° C., in not less than fifty minutes. A reasonable time of heating over fifty minutes, so long as the maximum temperature does not exceed the limits indicated, is not harmful, but the desired end-point of the reaction is indicated when a drop in temperature, even as little as 2° to 3° C., begins to occur without change in external heating conditions. At this stage in the reaction the cellulose in the wood is completely in solution in the zinc chloride, and the lignin has just started to decompose, which are specific conditions of prime importance to maximum quality in the activated carbon product. The completed reaction charge is a blackened, semi-plastic mass, of a suitable consistency for compacting into shapes convenient for further processing.

Various means can be used in the compacting and forming of the reacted plastic mass, but extrusion or molding into rods, plugs or blocks of appreciably larger size than the final granular product is desirable. This is important in producing more uniform density, and it further minimizes, in proportion to the total volume of the compacted shape, the area of the outer surface skin formed by contact with the die or mold. More specifically the extrusion or molding operation is controlled so that the ratio of die contacting surface area to total surface area of the ground and sized finished product does not substantially exceed that of a 1 inch diameter extruded solid rod subsequently sized to particles of 12 to 16 mesh (U. S. standard sieve scale). In the preferred embodiment of the process extrusion is employed, into rods of diameters from 1 inch to 7 inches, which will provide a surface ratio, as described, varying from 0.037 with the 1 inch rod to 0.005 on the rod of 7 inch diameter.

The extruded or molded stock is next heated or baked until it becomes entirely dry and brittle. This can be accomplished in any suitable heat treating oven, over a temperature range of from 160° C. to 300° C., and either in the presence or absence of air. Grinding and sizing is then effected as desired in the final product, usually to a particle size of from 8 to 16 mesh, and the undersized granules or fines can be reprocessed by addition to the raw material in the initial impregnation.

Careful control of the final calcining step, to fix the carbon in an active state, is again important to the purpose of the invention, and the sized stock is calcined to a temperature of at least 1000° C. Either a single-stage calcination, or one conducted in two stages, with a preliminary calcine at about 675° C. to 725° C., is suitable, but in both instances heating at the maximum temperature of 1000° C. or above is necessary for a period of at least thirty minutes. Commercial operation is somewhat more dependable and economical with a double calcination, in which a washing step, to remove and recover a large part of the residual zinc chloride, is interposed between the treatment at around 700° C. and the final calcination at 1000° C. to 1100° C. Since the low temperature primary calcine volatilizes only a small proportion of the impregnant, the bulk of the zinc chloride can thus be removed by a simple water washing, leaving a relatively non-corrosive, inert material to be handled under the high temperature heating conditions. Otherwise, or with direct calcination to 1000° C., the volatilized zinc chloride must all be recovered as a highly corrosive fume, and this is both inconvenient and expensive.

Universal practice in the preparation of active carbon for gas mask service involves a further treatment of the base material with suitable metallic catalysts. So far as the present invention is concerned the catalyst impregnation can be accomplished in any desirable manner, but a widely used procedure for this is known to the art as "whetlerizing." This consists in soaking the granular activated carbon in a solution of one or more metal salts, until complete impregnation occurs, and subsequently heating the carbon at temperatures sufficient to convert the metal impregnant to its most favorable catalytic form. In the preferred phases of this treatment copper along with silver, or with both silver and chromium, are the metallic catalysts used, and the adsorbent so made is commonly typed respectively as "AS Whetlerite" and "ASC Whetlerite."

The improved characteristics of the active carbon made by this invention are further illustrated in the following tables, showing test results on representative samples of the commercial product, with regard to those properties of primary importance to use as a gas mask adsorbent.

TABLE 1

| Sample | Carbon Without Catalyst | | | ASC Whetlerite Arsine, Minutes |
|---|---|---|---|---|
| | Apparent Density | Chlorpicrin Service, Minutes | Hardness | |
| 1 | .30 | 68 | 84 | 114 |
| 2 | .31 | 72 | 81 | 105 |
| 3 | .33 | 54 | 85 | 109 |
| 4 | .33 | 56 | 84 | 142 |
| 5 | .39 | 60 | 87 | 46 |

TABLE 2

*ASC Whetlerite accelerated tube tests*

| Sample | Cyanogen Chloride | | | | | |
|---|---|---|---|---|---|---|
| | Intercept, Cm. | | | Capacity, Mg./Ml. | | |
| | Initial | 2 Days Aging | 6 Days Aging | Initial | 2 Days Aging | 6 Days Aging |
| 1 | 1.7 | 2.0 | 3.6 | 99 | 61 | 63 |
| 2 | 1.5 | 2.2 | 3.3 | 93 | 104 | 34 |
| 3 | 1.5 | 2.1 | 2.4 | 114 | 71 | 68 |
| 4 | 1.4 | 1.9 | 2.2 | 107 | 77 | 74 |
| 5 | 1.8 | 2.1 | 3.6 | 116 | 55 | 54 |

TABLE 3

*ASC Whetlerite canister tests*

| Sample | Life in Minutes | | | |
|---|---|---|---|---|
| | Initial | 7 Days Aging | 14 Days Aging | 28 Days Aging |
| 1 | 77 | 38 | 14 | --- |
| 2 | 108 | 80 | 67 | 40 |
| 3 | 103 | 72 | 58 | 63 |
| 4 | 96 | 81 | 50 | --- |
| 5 | 68 | 39 | 30 | 18 |

All data given in the above tables was determined in accordance with standard testing methods of Chemical Warfare Service Specifications, and a further brief description of these will emphasize the true significance of the values shown.

The apparent density is measured on carbon of 10 to 14 mesh (Tyler Standard Screen Scale) particle size vibrated to minimum volume. A graduated glass cylinder of convenient size is used, into which a sample is slowly introduced through a funnel while vibrating the cylinder on a suitable vibrating table. The weight of the sample in grams divided by its volume in cubic centimeters gives the apparent density. In the products of this invention the apparent density is relatively low, but this contributes to a high adsorptive capacity, and is accomplished without sacrifice in hardness or strength.

The hardness values are indicative of the resistance of the carbon to abrasion, and as given, these values are unusually good, particularly for a carbon made from a low density raw material like sawdust. The hardness or strength is obtained by shaking 50 grams of 10 to 14 mesh (Tyler Standard Screen Scale) carbon for 30 minutes with 15 one-half inch and 15 three-eighth inch smooth steel balls in a special testing pan on a Tyler standard "Ro-tap" shaking machine. The testing pan is one of eight inch diameter, two inches deep, with a concave bottom cut on a radius of forty-three inches. After removal of the fines on a 20 mesh sieve, the remainder is weighed, and the weight in grams, when multiplied by two, gives the percentage of material surviving the test, or strength.

The chlorpicrin service test is a long established method of evaluating properties important to a gas mask adsorbent. The figures given under this heading represent the time in minutes that a 10 cm. layer (15.6 cc.) of dry 10 to 14 mesh carbon, held in a special tube 1.41 cm. in diameter, will completely adsorb, at room temperature, all the chlorpicrin from dry air containing 47 mg. per liter, and passed through the carbon at the rate of 1000 cc. per minute per square centimeter of bed area. The end-point of the test is determined by passing the effluent air through a silica tube heated to 450° C.–550° C., and then bubbling the air through a starch-iodide indicator solution composed of 10 parts of 5% potassium iodide solution and 1 part of 0.1% starch solution, wherein the first trace of chlorpicrin passing the sample is indicated by a characteristic blue coloration in the indicator solution. Each of the products shown in the table gives a chlorpicrin service well above that normally required and specified for gas mask uses.

The arsine service life test is performed in a manner similar to the chlorpicrin service test. The ASC Whetlerite, equilibrated at 80% relative humidity, is placed in a tube of 18.5 mm. to 19.5 mm. diameter, to a depth of 2 cm. above a supporting plate. The tube is so constructed that it may be immersed in a constant temperature (25° C.) water bath during test. Air containing 18.25 mg. per liter water vapor (80% relative humidity at 25° C.) and 3.8 to 4.2 mg. arsine per liter is passed through the sample, at a flow rate of 500 ml. per square centimeter tube area per minute. The effluent from the tube is bubbled through an indicator solution made by dissolving 8 gms. mercuric chloride in 500 ml. distilled water, adding 50 ml. concentrated chemically pure sulfuric acid, and the equivalent of 10.64 ml. of 0.10 normal potassium permanganate, all diluted to 1 liter of distilled water. An indicator bubbler contains 20 ml. of solution, and the end-point is noted when the solution turns from pink to water white. The service life of the sample is the number of minutes elapsed from the time the arsine gas is started through the sample to the time the third consecutive indicator bubbler is decolorized.

In the cyanogen chloride tube test the Whetlerite, equilibrated at 80% relative humidity, is placed in a series of tubes of 18.5 mm. to 19.5 mm. diameter, to depths of 2, 2½, 3, 3¼, 3½ and 4 cm. above a supporting plate. These tubes are then mounted in the test apparatus, and air, containing 18.25 mg. per liter water vapor (80% relative humidity at 25° C.) and 3.8 to 4.2 mg. per liter of cyanogen chloride, is passed through the tubes at a flow rate of 500 ml. per square centimeter tube area per minute. The effluent from the sample is bubbled through an indicator solution made up as follows: Forty gm. of sodium bicarbonate is dissolved in 700 ml. of distilled water. To this is added 250 ml. of pyridine and 50 ml. of 0.05 normal iodine solution. This solution is aged one week, and to 100 ml. of said solution there is then added 20 ml. of 1% starch solution, and a quantity of 0.05 normal arsenous oxide solution sufficient to dispel the blue color. Titration with a weak iodine solution is then made, until a faint blue color is permanently obtained, after which 0.01 normal iodine solution is added to give the equivalent of 6.4 ml. excess. The final solution is diluted to 1 liter with distilled water, and 20 ml. of this solution is used per bubbler tube.

The end-point of the bubbler is noted when the blue color fades to water white. This happens generally three or more times during a sample test; the service time for sample being defined as the number of minutes from the time the gas is turned into the sample up to the point when the first indicator bubbler goes into service that is decolorized in two minutes or less. After obtaining the service time in minutes for each separate bed depth as mentioned, the time in minutes is plotted against the depth of bed in centimeters. This should give a reasonably straight line, the projection of which crosses the bed depth axis at a positive value, which value is reported as "dead layer" or intercept, in centimeters. A second calculation is made from this curve by multiplying the slope of the curve, expressed in minutes per centimeter, by a constant which is the product of linear flow rate in centimeters per minute and cyanogen chloride concentration in milligrams per milliliter. This gives the adsorption capacity of the Whetlerite for cyanogen chloride. The expression capacity, equaling the product of slope, linear flow rate, and concentration, is derived from Hinshelwood's equation for adsorption, and in this particular case, the constant has a numerical value of 2.0.

The canister life test is conducted in apparatus designed by the Chemical Warfare Service, designated as machine E-2 using a M10A1 radial flow canister, the canister being filled with Whetlerite equilibrated at 80% relative humidity at 25° C. This machine simulates heavy breathing, the pump operating at 33 cycles per minute, delivering a peak flow of 150 liters per minute, with an average flow of 50 liters per minute. Air containing 4.0 mg. of cyanogen chloride and 18.25 mg. of water vapor per liter is pulled through the canister. Part of the effluent is passed through an indicator bubbler at a rate of 500 ml. per minute, using 15 ml. per bubbler of the same starch-iodine-pyridine solution described in the above tube test. The service time of the canister is the number of minutes from the time the gas is turned into the sample up to the point when the first indicator bubbler goes into service that is decolorized in two minutes or less.

To test the stability of the ASC Whetlerite under hot humid conditions of storage, two methods of aging were used in the above tabulations. The samples evaluated by tube testing were exposed to large volumes of air containing 80% relative humidity as water vapor (at 25° C.) until the weight of the Whetlerite became constant. This is usually accomplished by passing the humidified air through the Whetlerite sample at a rate of 20 liters per minute per 100 grams of Whetlerite, equilibrium occurring in about 24 hours. Immediately after humidification the samples were placed in vapor-tight containers, and stored in a constant temperature oven at 50° C. until tested. When tested the samples were cooled to room temperature before breaking the seal on the container, in order to preserve the proper moisture content of the Whetlerite. Samples evaluated in the canister test were humidified in similar manner in the assembled canister. These canisters were then placed in a vapor-tight container and stored at 35° C. until tested. Again precautions were observed to cool the sample to room temperature before breaking the seal, to preserve the proper moisture content of the Whetlerite.

To those skilled in the art modifications will be apparent, over the preferred procedure described, which are within the essential embodiments of the invention. As already indicated there is little preference in the kind of raw material most appropriate, and both hard and soft wood shavings or sawdust, from various sources, have given excellent results. Peat, lignite, agricultural wastes, or other low density cellulosic substances, may be equally suitable as starting products, presenting a wide choice of raw materials, which are cheap and abundant. Other factors, such as the exact amounts of impregnant used, the particular form and size of the compacted digested mix, or certain of the temperature controls, can also be varied, where not specifically limited; and no restrictions to the invention are intended, other than as defined in the appended claims.

We claim:

1. Process of making activated carbon of characteristics valuable as gas mask adsorbent, which comprises impregnating low density cellulosic material with concentrated aqueous zinc chloride, continuously agitating the impregnated mixture while heating to a temperature of about 120° C. to 145° C. at a heating rate to provide said maximum temperature in a period not less than about fifty minutes, terminating said heating when the mix temperature begins to decrease without change in external heat input, compacting the reacted mass into forms of appreciable size, heating said forms at a temperature producing a dry and brittle condition, crushing the dried forms into granular particles, and subsequently calcining the granular product at a temperature not less than about 1000° C. for a period of at least thirty minutes.

2. Process of making activated carbon of characteristics valuable as gas mask adsorbent, which comprises impregnating low density cellulosic material with concentrated aqueous zinc chloride, continuously agitating the impregnated mixture while heating to a maximum temperature of about 120° C. to 145° C. at a heating rate to provide said maximum temperature in a period not less than about fifty minutes, terminating said heating when the mix temperature begins to decrease without change in external heat input, compacting the reacted mass into forms of appreciable size, heating said forms to a dry and brittle condition at a temperature of about 160° C. to 300° C., crushing the dried forms into granular particles, and subsequently calcining the granular product at a temperature of about 1000° C. to 1100° C. for a period of at least thirty minutes.

3. Process of making activated carbon of characteristics valuable as gas mask adsorbent, which comprises impregnating finely-divided wood with concentrated aqueous zinc chloride solution, continuously agitating the impregnated mixture while heating to a maximum temperature of about 128° C. to 132° C. at a heating rate to provide said maximum temperature in a period not less than about fifty minutes, terminating said heating when the mix temperature begins to decrease without change in external heat input, compacting the reacted mass into forms appreciably larger in size than the final granular product, heating said forms to a dry and brittle condition at a temperature of 160° C. to 300° C., crushing the dried forms into granular particles, calcining the granules at a temperature of about 675° C. to 725° C., leaching out a substantial portion of the residual zinc compounds, and subsequently recalcining the product at a temperature not lower than 1000° C. for a period of at least thirty minutes.

4. Process of making activated carbon of characteristics valuable as gas mask adsorbent, which comprises impregnating finely-divided wood with concentrated aqueous zinc chloride solution, continuously agitating the impregnated mixture while heating to a maximum temperature of about 128° C. to 132° C. at a heating rate to provide said maximum temperature in a period not less than about fifty minutes, terminating said heating when the mix temperature begins to decrease without change in external heat input, extruding the reacted mass into solid rods of from one inch to seven inches in diameter, heating said rods to a dry and brittle condition at a temperature of 160° C. to 300° C., crushing the dried rods into granular particles, calcining the granules at a temperature of about 675° C. to 725° C., leaching out a substantial portion of the residual zinc compounds, and subsequently recalcining the product at a temperature not lower than 1000° C. for a period of at least thirty minutes.

5. Process of making activated carbon of characteristics valuable as gas mask adsorbent, which comprises impregnating finely-divided wood with aqueous zinc chloride solution, of a concentration about 65% by weight and in amount to provide about 110 parts of zinc chloride to 100 parts of wood on a dry weight basis, continuously agitating the impregnated mixture while heating to a maximum temperature of about 128° C. to 132° C. at a heating rate to provide said maximum temperature in a period not less than about fifty minutes, terminating said heating when the mix temperature begins to decrease without change in external heat input, extruding the reacted mass into solid rods of from one inch to seven inches in diameter, heating said rods to a dry and brittle condition at a temperature of 160° C. to 300° C., crushing the dried rods into granular particles, calcining the granules at a temperature of about 675° C. to 725° C., leaching out a substantial portion of the residual zinc compounds, and subsequently recalcining the product at a temperature of about 1000° C. to 1100° C. for a period of about one hour.

6. In a process for making activated carbon gas mask adsorbent by the zinc chloride impregnation treatment of wood shavings or sawdust, the steps which comprise calcining the product, after previous zinc chloride digestion, compacting, and sizing, at a temperature of about 675° C. to 725° C., leaching out the greater part of the residue zinc compounds, and subsequently recalcining at a temperature of about 1000° C. to 1100° C. for a period of at least thirty minutes.

JOHN A. SLYH.
MILTON JANES.
ERNEST G. DOYING.

REFERENCES CITED

The following references are of record in the file of this patent:

UNITED STATES PATENTS

| Number | Name | Date |
|---|---|---|
| 1,610,399 | Urbain | Dec. 14, 1926 |
| 1,735,096 | Urbain | Nov. 12, 1929 |
| 1,902,986 | Barker | Mar. 28, 1933 |
| 2,083,303 | Krczil | June 8, 1937 |

FOREIGN PATENTS

| Number | Country | Date |
|---|---|---|
| 67,901 | Switzerland | Apr. 24, 1914 |